Dec. 17, 1968    A. G. REYNOLDS    3,416,612
LAND LEVELING EQUIPMENT
Filed June 14, 1966
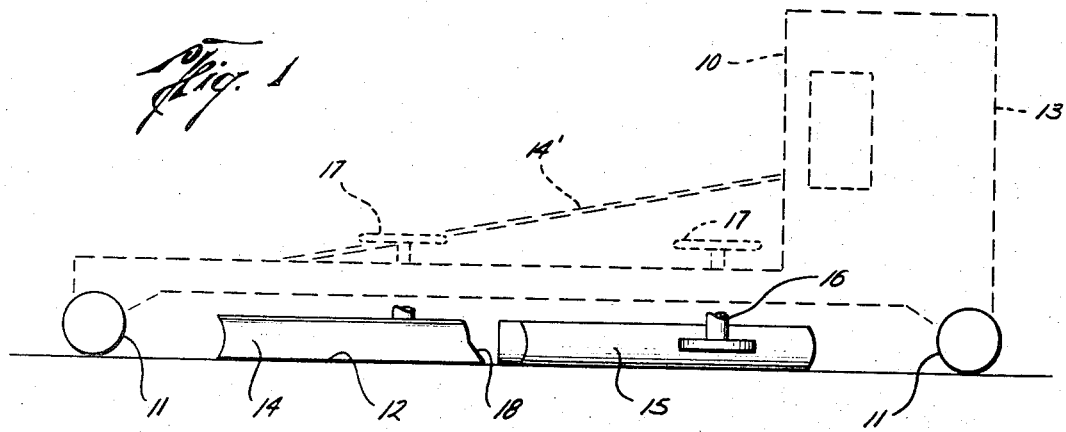
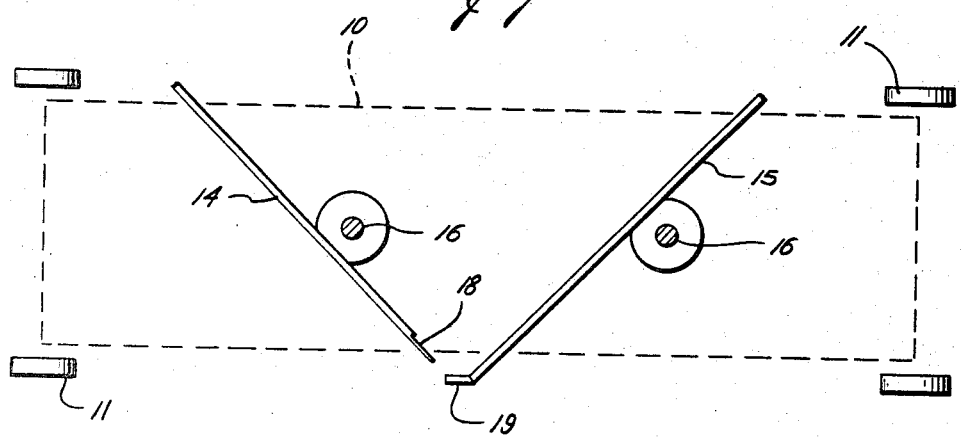
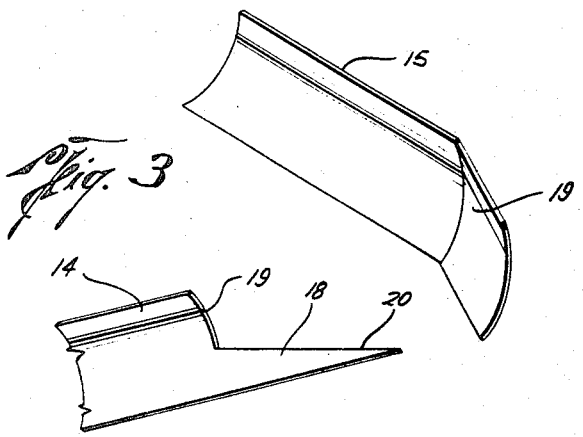
Aaron G. Reynolds
INVENTOR.
BY
Browning, Simms, Hyer
& Eickenroht.
ATTORNEYS

United States Patent Office 3,416,612
Patented Dec. 17, 1968

3,416,612
LAND LEVELING EQUIPMENT
Aaron G. Reynolds, McAllen, Tex., assignor to Reynolds Research & Manufacturing Corp., McAllen, Tex.
Filed June 14, 1966, Ser. No. 557,430
3 Claims. (Cl. 172—784)

This invention relates to improvements in land leveling equipment of the type in which a pair of blades extends in opposite diagonal directions one in front of the other across a forwardly moving frame.

Of course, some of the soil accumulated by the front blade is distributed into the intervening low spots as it move diagonally toward the trailing end of the front blade. This latter end is spaced laterally inwardly of the leading end of the rear blade so that other accumulated soil moving therepast will be picked up by the rear blade. The rear blade not only further levels the high spots, but also distributes soil accumulated by the front blade as well as additional soil accumulated by the rear blade into the low spots by moving it diagonally toward the trailing end of the rear blade—i.e., in a lateral direction opposite to that in which the soil is moved by the front blade.

One problem which has been encountered in the use of the conventional angle blade plane is the location of the trailing end of the front blade relative to the leading end of the rear blade under varying working conditions. Thus, in the event a small volume of soil is delivered by the front blade to the rear blade, it may be picked up by the rear blade inwardly of the leading end of the rear blade. This, of course, prevents such soil from being distributed over the entire lateral extent of the rear blade. On the other hand, in the event a large volume of soil is accumulated by the front blade, some of it may spill over the outside of the leading end of the rear blade and thus not be distributed back across the rear blade.

An attempt has been made to solve this problem by disposing the trailing end of the front blade relatively close to the leading end of the rear blade in an attempt to insure complete distribution of small volumes of soil and extending a wing forwardly from the leading end of the latter in an effort to prevent larger volumes from spilling over. However, it has been found that large volumes of accumulated soil have a tendency to ball up between the trailing end of the front blade and the wing, especially when the soil is moist and trashy.

An object of this invention is to provide land leveling equipment of this type which obviates the foregoing problems so as to permit its use under varying conditions.

Another object is to provide such equipment having blades so constructed and arranged as to insure full distribution across the rear blade of substantially all soil accumulated by and moving past the trailing end of the front blade.

In the drawings wherein like reference character are used throughout to designate like parts:

FIG. 1 is a side elevational view of land leveling equipment constructed in accordance with the present invention;

FIG. 2 is a plan view of the equipment of FIG. 1; and

FIG. 3 is a perspective view on a large scale of the trailing end of the front blade and leading end of the rear blade of equipment of FIGS. 1 and 2.

With reference now to the details of the above-described drawings, this equipment includes a frame 10 shown schematically by broken lines in FIGS. 1 and 2 as being generally elongate and supported at its opposite ends by laterally spaced apart wheels 11 for movement forwardly (to the left in FIGS. 1 and 2) over the ground level 12. The frame may be self-propelled, as by means of a motor carried within a driver's cab 13, and steerable by any suitable means accessible to the driver, including a steering column 14 extending from the cab to the front wheels. Alternatively, the frame may be pulled by a tractor or other suitable means, in which case it may not be steerable. In any case, the construction of the frame is unimportant to the present invention, except for its support of the land leveling blades to be described below.

Thus, as shown in FIGS. 1 and 2, a pair of blades 14 and 15 are carried by the frame for extension laterally thereacross, with blade 14 disposed in front of blade 15. More particularly, these blades extend diagonally in opposite directions across an intermediate portion of the frame, so that the trailing end of the front blade 14 is relatively near the leading end of the rear blade 15. More particularly, and as previously described, in land leveling equipment of this type, the trailing end of the front blade is disposed laterally inwardly of the leading end of the rear blade so that soil accumulated by the front blade and moved diagonally thereacross to its trailing end will spill over on to the leading end of the rear blade for distribution diagonally thereacross during forward movement of the frame.

Each of the blades 14 and 15 is straight from one end to another so that the soil is moved freely across its lateral extent. Preferably, however, each blade is curved concavely between its upper and lower edge, as shown in FIG. 3. The lower edge of each blade is, of course, a cutting edge adapted to level high spots of the ground over which the frame moves. Normally, each of the blades is disposed at approximately a 45° angle to the direction of travel of the frame. However, both the height and angular disposition of each blade are adjustable by any suitable means, such as shaft 16 connected at their lower ends to the back sides of the blade and manipulatable at their upper ends by hand wheels 17 or the like. These adjustments are, of course, well known in the art and thus need not be shown in detail.

In accordance with the present invention, however, a portion 18 of the front blade 14 adjacent its trailing end is of reduced height so that a large amount of relatively high levels of soil accumulated by the front blade and moved diagonally thereacross will be free to pass over the upper edge of portion 18 prior to movement beyond the trailing end of the front blade. At the same time, however, this portion 18 of reduced height will retain relatively low levels of soil accumulated by the front blade so as to move them to a point approaching the trailing end of the front blade. This, of course, insures that some accumulated soil will in any case, be delivered to the leading end of the rear blade 15 so that there is full coverage across the lateral extent of the rear blade.

Preferably, a wing 19 extends forwardly from the leading edge of the rear blade 15 to a point close to the trailing end of the front blade 14 so as to provide a shield against spillage of large volumes of soil. At the same time the reduced portion 18 adjacent the trailing end of the front blade will not cause the soil confined by the wing 19 to ball up as it spills over onto the leading end of blade 15.

In its preferred form, and as shown in FIG. 3, the blade portion 18 is of gradually decreasing height in a direction towards the trailing end of the blade 14. Thus, the lowest levels of soil accumulated by the front blade will be caused to move the longest lateral distance diagonally across the front blade 14, while slightly higher levels of soil will be permitted to spill over the reduced portion 18 before reaching the trailing end of the front blade.

In the specific embodiment shown in FIG. 3, this portion of reduced height is formed by a substantially vertical edge 19 of the front blade which extends downwardly from its upper edge to a laterally extending edge 20 which tapers downwardly to a substantial vanishing point at the trailing end of the front blade. As an obvious alternative to the above, the upper surface of reduced portion 18 may instead be curved in whole or in part between the upper edge of front blade 14 and the trailing end thereof. As a further alternative to the illustrated embodiment of the invention, such reduced portion 18 may terminate a level raised above the lower edge of front blade 14—i.e., it need not necessarily extend to a substantial vanishing point at the trailing end of the front blade. Other alternatives will be obvious to those skilled in the art in the light of the foregoing description.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Land leveling equipment, comprising a frame movable forwardly over the ground level, and a pair of blades carried by and extending one in front of the other in opposite diagonal directions across the frame, the trailing end of the front blade being disposed laterally inwardly of the leading end of the rear blade so that soil accumulated by said front blade and moving past said trailing end will be received by said rear blade for spreading over the lateral extent of said rear blade, and said front blade including a portion adjacent its trailing end having an upper edge which terminates below the upper edge of the portion of said front blade adjacent its leading end so that relatively high levels of soil accumulated by said front blade will be free to pass over said portion prior to movement beyond said trailing end of said front blade.

2. Land leveling equipment of the character described in claim 1, wherein said portion of reduced height is of gradually decreasing height in a direction toward said trailing end.

3. Land leveling equipment of the character described in claim 1 wherein said portion of reduced height is formed by a substantially vertical edge which extends downwardly from the upper edge of the front blade to a laterally extending edge which tapers downwardly to said trailing end.

References Cited

UNITED STATES PATENTS

| | | | |
|---|---|---|---|
| 1,663,965 | 3/1928 | Aikele | 172—787 X |
| 1,743,532 | 1/1930 | Crow et al. | 172—148 X |
| 1,962,990 | 6/1934 | Katzenberger | 172—145 |

ABRAHAM G. STONE, *Primary Examiner.*

A. E. KOPECKI, *Assistant Examiner.*

U.S. Cl. X.R.

172—145